Aug. 18, 1970     H. Y. DE LAVENNE     3,524,678
SAFETY DEVICE FOR A PASSENGER ON A VEHICLE
Filed Jan. 9, 1969     3 Sheets-Sheet 1
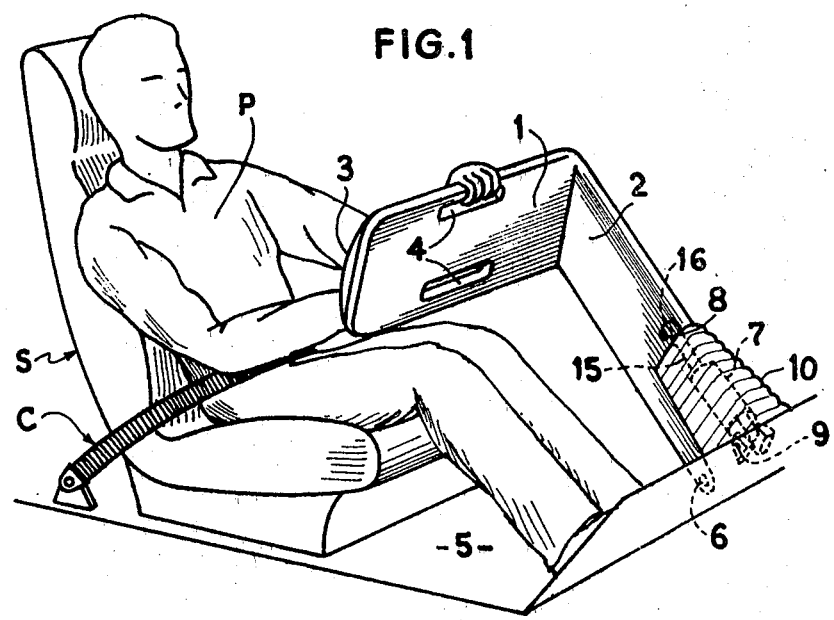
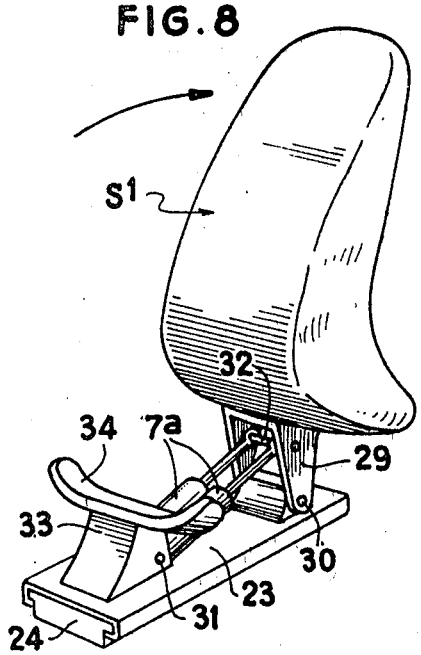
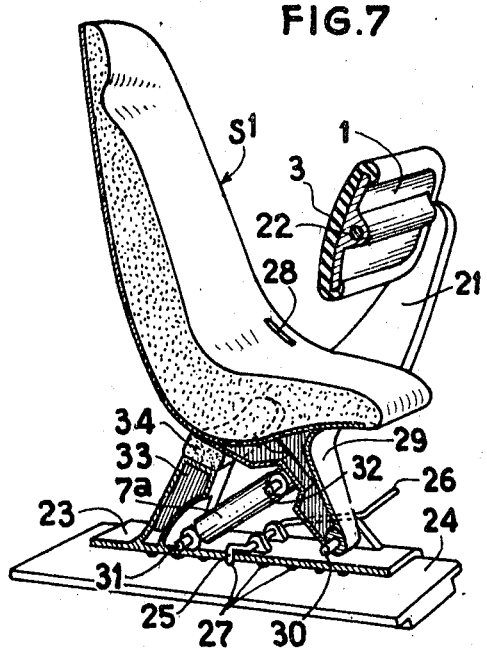

United States Patent Office 3,524,678
Patented Aug. 18, 1970

1

3,524,678
SAFETY DEVICE FOR A PASSENGER
ON A VEHICLE
Hubert Y. de Lavenne, Meudon-Bellevue, France, assignor to Automobiles Peugeot, Paris, France, and Regie Nationale des Usines Renault, Billancourt, France, both French body corporates
Filed Jan. 9, 1969, Ser. No. 789,989
Claims priority, application France, Mar. 20, 1968, 144,498
Int. Cl. B60r 21/06, 21/10
U.S. Cl. 297—216                               7 Claims

ABSTRACT OF THE DISCLOSURE

Safety device for a passenger on a vehicle. The device comprises a panel which is pivotable relative to the body of the vehicle by the thrust exerted by the passenger when thrown forwardly by a brutal impact on the front of the vehicle. Energy absorbing and dissipating means restoring no energy connects the panel to the body so as to brake the pivotal movement of the panel and stop the panel in a position in which there is no risk of the passenger striking his head against a hard part of the body.

---

The present invention relates to a safety device adaptable to an automobile or other vehicle and intended to absorb and limit the forward movements of the passenger in the case of impact of the front of the vehicle, this device allowing great freedom of movement in the normal position of the passenger.

The device according to the invention comprises, in combination, a panel connected to a wall of the body in the body of the vehicle in such manner as to be movable relative to said body by the thrust exerted by the passenger thrown forwardly by a brutal impact, and at least one energy absorbing and dissipating means affording no subsequent restoration of energy which connects said panel to said body in such manner that the movement of said panel is progressively braked by said means whose maximum travel is such that bearing in mind the position of said panel at rest in said body, there is no risk of the passenger striking his head against a hard part of said body, such as a windshield.

The effectiveness of the device of the invention from the point of view of safeguarding the passenger in the case of accident resides mainly in the following features.

Upon sudden impact, the body of the passenger leaves the backrest of the seat and bears against the panel which moves while being braked by said absorbing and dissipating means. Consequently, the deceleration is reduced at the level of the head of the passenger owing to the progressive braking distributed over a large path; the final impact against the windshield or other hard part of the body is avoided; there is no sudden return movement; the shear stress on the spine of the passenger is reduced owing to the forward inclination of his chest.

Preferably, the panel is carried rigidly by a support which is pivoted to the floor of the vehicle to which said support is moreover connected by said energy absorbing and dissipating means.

According to one embodiment of the invention, said support consists of a rigid leg pivoted directly to the floor of the vehicle.

According to another embodiment, the support consists of the very seat of the passenger, said seat being pivoted to the floor of the vehicle and connected to the floor by at least one energy absorbing and dissipating means.

Further features and advantages of the invention will be apparent from the ensuing description with reference to the accompanying drawings.

2

In the drawings:

FIG. 1 is a three-quarter view of a place for a passenger of a vehicle equipped with the safety device according to the invention which is independent of the seat;

FIG. 7 is a perspective and longitudinal vertical sectional view of the assembly comprising the safety device and the seat, and FIG. 8 is a rear perspective view of the assembly shown in FIG. 7.

Figure 2:
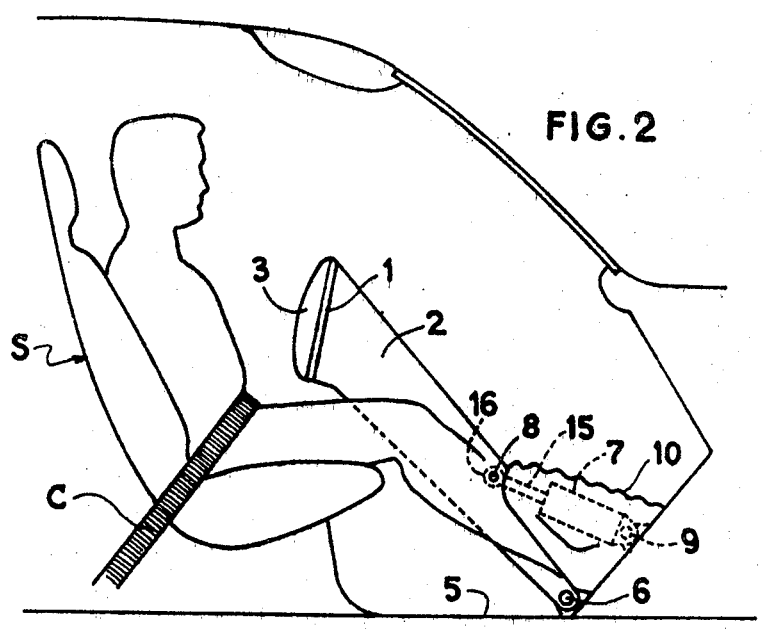
FIG. 2 is a diagrammatic elevational view in a plane parallel to the longitudinal axis of the vehicle.

In the embodiment shown in FIGS. 1–4, there is disposed in front of the seat S of the passenger P a protecting panel 1 which is rigidly secured to a lateral rigid leg 2 disposed on the side of the seat remote from the door of the vehicle, that is, on the left side for a passenger seated on the right of the driver. Preferably, the passenger is held on the seat S by an abdominal belt C which allows the passenger a great freedom of movement.

The panel 1 and the leg 2 are constructed of a rigid material, such as metal or reinforced plastics, but the face of the panel 1 adjacent the passenger is covered with padding, for example of foam plastics material 3. As an accessory, this panel 1 can be provided with openings such as 4 allowing the passenger to grip the panel.

The leg 2 is connected to the floor 5 of the vehicle directly by a pivot 6 having a transverse pivot axis and moreover, through energy absorbing and dissipating means 7. The means 7 is pivoted at 8 to the leg 2 and at 9 to the floor. The pivot 9 is forward of the pin 6 and the means 7 is adapted to work under compression.

A bellows 10, for example consisting of a sheet of flexible corrugated plastics material, protects the device 7 without hindering the operation thereof.

This energy absorbing and dissipating means can advantageously be of the type described in the French patent application No. 143,652 filed on Mar. 15, 1968, by the applicant which comprises (see FIG. 4) a rigid metal case 11 terminating at its base in an end element 12 having an eye 12a whereby it can be pivoted to the floor of the vehicle by the pivot 9.

The upper end of the case is closed by a plug 13 which is screwed into position and comprises a hollow skirt portion 14 for guiding a rod 15. The latter terminates outside the case 11 in an eye 16 whereby it can be pivoted to the leg 2 by the pivot 8 and internally in a biconical portion 17 which is located rather near the plug 13 in its position of rest.

The interior of the case 11 is filled with a material 18 which defines a longitudinal preferably frustoconical cavity or bore 19 whose maximum diameter is adjacent the plug 13 and less than that of the block 17.

Figure 3:
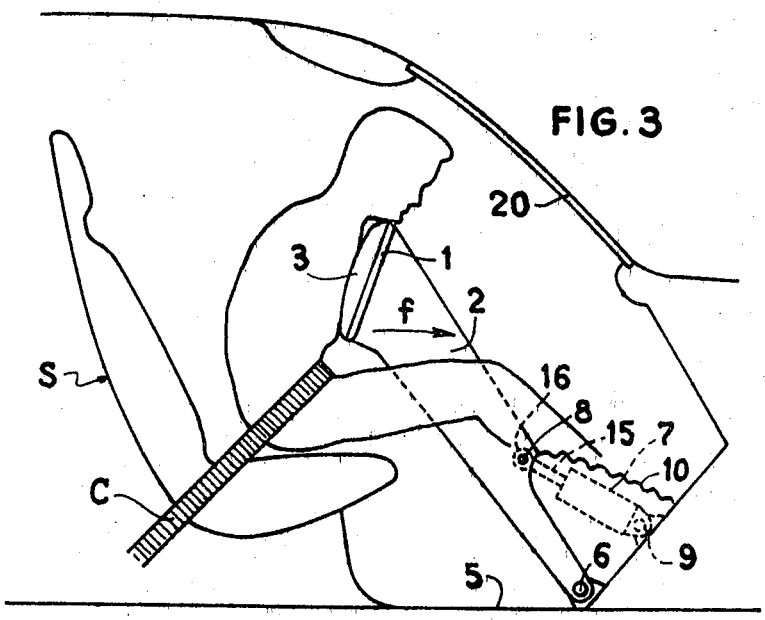
FIG. 3 is a view identical to the view shown in FIG. 2 after impact.
Figure 4:
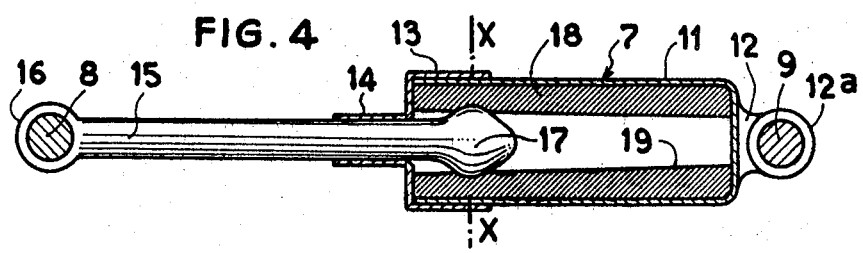
FIG. 4 is a longitudinal sectional view through the energy absorbing and dissipating means.
Figure 5:
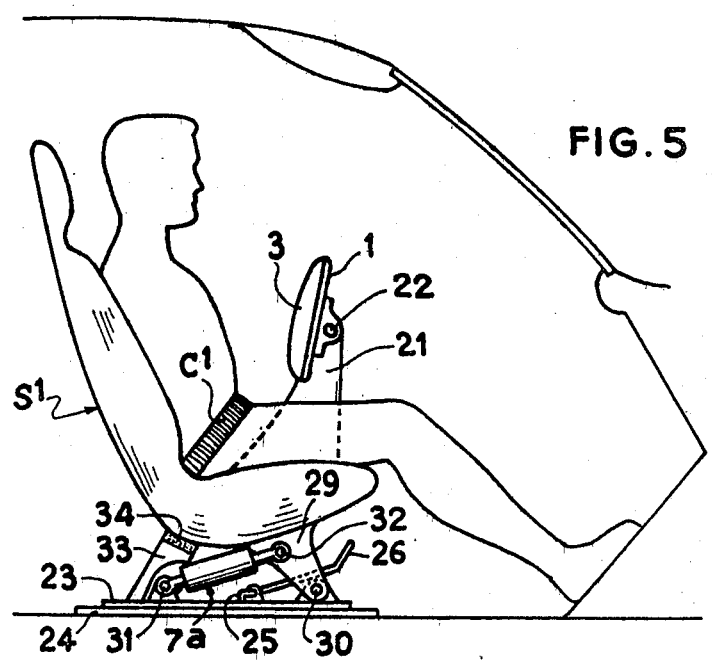
FIGS. 5 and 6 are views similar to FIGS. 2 and 3 of an arrangement wherein the safety device is combined with the seat.

In the event of impact at the front end of the vehicle, which suddenly stops the latter, the passenger is thrown onto the panel 1 which then pivots about the pivot 6 in the direction of arrow f (FIG. 3).

This movement is energetically but progressively braked by the device 7 whose centre block 17 must push its way into the material 18. The total travel of this device is such that the pivoting of the panel 1 is stopped before the passenger strikes his head against the windshield 20 (FIG. 3).

The material 18 of the device 7 can be: (a) a deformable but inelastic material, such as lead, in which case, when there is a relative movement between the case 11 and the rod 15 with its head 17, this material must flow from one side to the other of this head; or (b) preferably an elastically yieldable material, such as polyurethane or an elastomer as described in the aforementioned French patent application No. 143,652, the head 17 being in this case at least roughly symmetrical relative to the transverse plane X—X (FIG. 4) so that this material, which is compressed radially in the region of the head, does not produce a noticeable axial component in its elastic reaction on the rod 15.

In the embodiment shown in FIGS. 5–8, the invention is applied to a seat $S^1$ which comprises in the front part a rigid lateral arm 21 carrying the panel 1 with its padding 3. In this embodiment, the panel is mounted on a transverse pin 22 carried by the arm in such manner that it is practically impossible to turn it by hand but, under the action of a violent forward thrust of the passenger under the effect of impact of the vehicle, it is capable of slightly pivoting about said pivot 22 so that the pressure of the thorax is distributed over the largest possible area of this panel (see FIG. 6).

The seat $S^1$ is preferably connected to the floor of the vehicle by a slide 23 movable along a guide member 24 fixed to the floor. The slide-mounted seat is fixed in such manner that it is adjustable in position as desired. This seat is held stationary by locking means such as a finger 25 integral with a crank 26 and engageable in any one of a series of apertures 27 in the member 24.

It should be noted that the seat can be adjusted with no need to modify the length of the abdominal belt $C^1$ since the latter is fixed to the seat and not to the body of the vehicle. The belt is fixed to recesses 28 in the seat by a known snap device. However, it can also be fixed by permanent means, such as bolts or rivets.

The framework of the seat $S^1$ comprises a front leg 29 which is pivoted at its forwardly-extending lower end by a transverse pivot pin 30 to the slide 23. At the rear of the leg 29, two energy-absorbing means 7a of one of the types described hereinbefore having lead or similar inelastic deformable material or a polyurethane or other elastic material, are connected to the slide 23 by a pivot 31 and to the upper part of the foot 29 by a pivot 32.

The two devices 7a, which are arranged to work under tension, are disposed side-by-side on each side of the axis of symmetry of the seat so that transverse stability is achieved by arranging that the rear part of the seat rests on a cradle. The latter, which is connected to the slide 23, comprises a frame 33 of metal or reinforced rigid plastics material covered with a foam pad 34 of rubber or cellular plastics material capable of being crushed several centimetres so as to enable the energy-absorbing means 7a to perform their function in the case of impact at the rear of the vehicle.

This embodiment operates in the following manner:

In the event of suddent impact, the chest of the passenger exerts on the panel 1 a pressure, the effect of which is added to the pull exerted on the abdominal belt $C^1$ and rotates the seat $S^1$ about the pivot pin 30.

Figure 6:
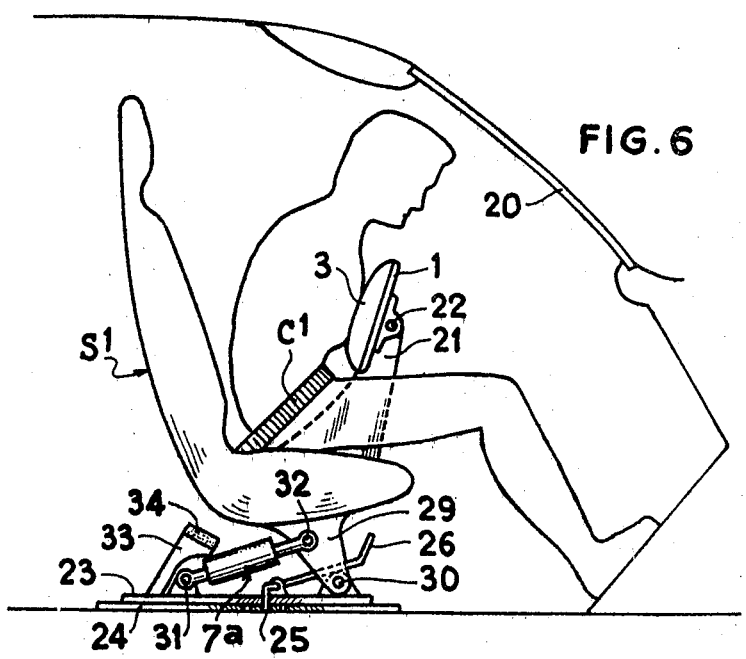

This movement is braked energetically but progressively by the energy-absorbing means 7a whose maximum travel limits the pivoting of the seat to such value that there is no risk of the passenger striking his head against the windshield 20 (FIG. 6).

Although specific embodiments of the invention have been described, many modifications and changes may be made therein without departing from the scope of the invention.

Having now described my invention what I claim as new and desire to secure by Letters Patent is:

1. In a vehicle having a body, a passenger seat and mounting means between said seat and said body, a safety device comprising pivot means for pivotally connecting said seat to said mounting means, support means rigidly connected to said seat and supporting a padded panel located substantially in front of the passenger, and an energy absorbing device provided between said seat and said mounting means, the arrangement of said energy absorbing device and said seat being such that under front impact conditions the assembly of the seat and the support means rotates about said pivot means against the braking action of the energy absorbing device and the rotation against the braking action continues after impact of the passenger against said padded panel until the impact is absorbed.

2. A safety device as claimed in claim 1, wherein said mounting means comprises a slide which is longitudinally adjustable in position relative to said body of the vehicle.

3. A safety device as claimed in claim 1, further comprising a safety belt fixed to the seat.

4. A safety device as claimed in claim 1, wherein said seat comprises a framework, a front leg integral with or fixed to the front part of said framework and depending from said framework, said leg being pivoted at its lower end to said mounting means, said mounting means further comprising a cradle on which rests the rear part of said framework.

5. A safety device as claimed in claim 4, wherein said cradle comprises a rigid structure covered with a padding on its face receiving the rear part of the framework.

6. A safety device as claimed in claim 4, wherein said energy absorbing device is of the type comprising two telescopically movable members connected respectively to the framework of the seat and to a point of said mounting means located at the rear of said pivot means.

7. A safety device as claimed in claim 6, comprising two of said energy absorbing devices arranged in parallel relation to each other between said framework and said mounting means.

References Cited

UNITED STATES PATENTS

| 2,801,866 | 8/1957 | Naslund. |
| 2,833,554 | 5/1958 | Ricordi. |

FOREIGN PATENTS

| 1,352,218 | 1/1963 | France. |
| 1,358,956 | 6/1963 | France. |
| 1,074,992 | 2/1960 | Germany. |

BENJAMIN HERSH, Primary Examiner

R. R. SONG, Assistant Examiner

U.S. Cl. X.R.

280—150; 296—65